United States Patent
Castellanos Zamora et al.

(10) Patent No.: US 12,192,860 B2
(45) Date of Patent: Jan. 7, 2025

(54) SHORT MESSAGE SERVICE (SMS) DELIVERY

(71) Applicant: Telefonaktiebolaget LM Ericsson (publ), Stockholm (SE)

(72) Inventors: David Castellanos Zamora, Madrid (ES); George Foti, Dollard des Ormeaux (CA); Jose Miguel Dopico Sanjuan, Torrelodones (ES); Ralf Keller, Würselen (DE); Jesús Angel De Gregorio Rodriguez, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 305 days.

(21) Appl. No.: 17/762,508

(22) PCT Filed: Sep. 21, 2020

(86) PCT No.: PCT/IB2020/058796
§ 371 (c)(1),
(2) Date: Mar. 22, 2022

(87) PCT Pub. No.: WO2021/064507
PCT Pub. Date: Apr. 8, 2021

(65) Prior Publication Data
US 2022/0360954 A1    Nov. 10, 2022

Related U.S. Application Data

(60) Provisional application No. 62/908,886, filed on Oct. 1, 2019.

(51) Int. Cl.
*H04W 4/14* (2009.01)
*H04W 8/18* (2009.01)
(Continued)

(52) U.S. Cl.
CPC ............... *H04W 4/14* (2013.01); *H04W 8/18* (2013.01); *H04W 60/00* (2013.01); *H04W 68/005* (2013.01)

(58) Field of Classification Search
CPC ......... H04W 4/14; H04W 8/18; H04W 60/00; H04W 68/005
(Continued)

(56) References Cited

U.S. PATENT DOCUMENTS 5,884,172 A * 3/1999 Sawyer ................. H04W 60/00
    455/435.1
10,736,017 B2   8/2020 Zhou et al.
(Continued)

FOREIGN PATENT DOCUMENTS

CN    109996196   *  1/2019
CN    109660978 A    4/2019
(Continued)

OTHER PUBLICATIONS

3rd Generation Partnership Project; Technical Specification Group Core Network and Terminals: User Data Interworking, Coexistence arid Migration; Stage 2; (Release 16), May 28, 2019.*
(Continued)

*Primary Examiner* — Omar Casillashernandez
(74) *Attorney, Agent, or Firm* — Weisberg I.P. Law, P.A.

(57) ABSTRACT

Apparatuses and methods for short message service (SMS) delivery are disclosed. In one embodiment, a method implemented in a unified data management, UDM, node includes setting a short message service, SMS, function, SMSF, registration notification flag to detect an SMSF registration event associated with a user equipment, UE. In another embodiment, a method implemented in a home subscriber server, HSS, node includes sending a request to subscribe to a notification at a unified data management, UDM, node about a short message service, SMS, function, SMSF, registration event associated with a user equipment, UE.

26 Claims, 5 Drawing Sheets

(51) Int. Cl.
*H04W 60/00* (2009.01)
*H04W 68/00* (2009.01)

(58) Field of Classification Search
USPC .......................................................... 340/7.21
See application file for complete search history.

(56) References Cited

U.S. PATENT DOCUMENTS

| | | | | |
|---|---|---|---|---|
| 2006/0153063 | A1* | 7/2006 | Islam ................... | H04W 60/00 |
| | | | | 370/216 |
| 2019/0124561 | A1* | 4/2019 | Faccin .................. | H04W 16/04 |
| 2019/0174449 | A1 | 6/2019 | Shan et al. | |
| 2020/0213819 | A1* | 7/2020 | Kim ....................... | H04W 8/183 |

FOREIGN PATENT DOCUMENTS

| | | |
|---|---|---|
| CN | 109996196 A | 7/2019 |
| EP | 2903314 A1 | 8/2015 |
| WO | 2016141629 A1 | 9/2016 |
| WO | 2018/132462 A1 | 7/2018 |
| WO | 2018/202079 A1 | 11/2018 |
| WO | WO2018202079 * | 11/2018 |
| WO | 2019/022442 A2 | 1/2019 |

OTHER PUBLICATIONS

Chinese Office Action and English summary translation of the Chinese Office Action dated Oct. 27, 2023 issued in Application No. 202080069102.2, consisting of 10 pages.
Extended European Search Report dated Oct. 23, 2023 issued in EP Application No. 23 19 1306.2, consisting of 7 pages.
3GPP TSG CT WG4 Meeting #58bis, C4-122026, Prague, Czech Republic; Oct. 15-19, 2012, Change Request 29.272 CR 0449 rev—Current version: 11.4.0, Title: MME de-registration for "SMS in MME", Source to WG: Ericsson, Source to TSG: CT4, Work item code: SIMTC-PS_only, Date: Sep. 26, 2012, Category B, consisting of 8 pages.
International Search Report and Written Opinion dated Nov. 2, 2020 issued in PCT Application No. PCT/IB2020/058796, consisting of 12 pages.
International Preliminary Report on Patentability dated Sep. 14, 2021 issued in PCT Application No. PCT/IB2020/058796, consisting of 25 pages.
3GPP TS 23.cde V0.3.0 (May 2019) 3rd Generation Partnership Project; Technical Specification Group Core Network and Terminals; User Data Interworking, Coexistence and Migration; Stage 2; (Release 16), consisting of 18 pages.
3GPP TS 23.040 V15.3.0 (Mar. 2019) 3rd Generation Partnership Project; Technical Specification Group Core Network and Terminals; Technical realization of the Short Message Service (SMS); (Release 15), consisting of 216 pages.
3GPP TS 23.502 V16.1.1 (Jun. 2019) 3rd Generation Partnership Project; Technical Specification Group Services and System Aspects; Procedures for the 5G System; Stage 2; (Release 16), consisting of 495 pages.
3GPP TS 23.632 V0.4.0 (Sep. 2019) 3rd Generation Partnership Project; Technical Specification Group Core Network and Terminals; User Data Interworking, Coexistence and Migration; Stage 2;; (Release 16), consisting of 33 pages.
Colombian Office Action and English language translation of the Colombian Office Action dated Oct. 3, 2024 issued in corresponding Colombian Patent Application No. NC2022/0005223, consisting of 20 pages.

* cited by examiner

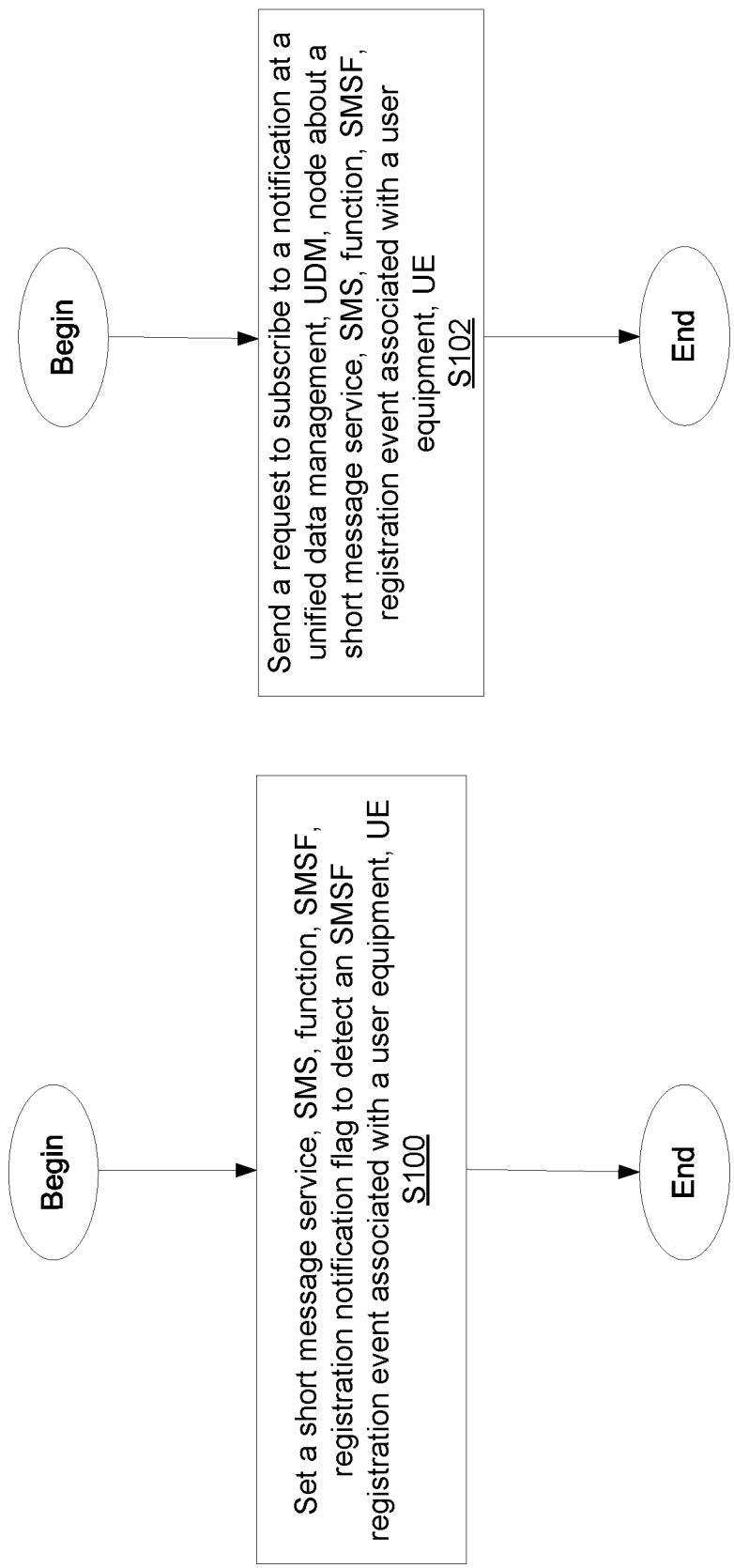

SHORT MESSAGE SERVICE (SMS) DELIVERY

CROSS-REFERENCE TO RELATED APPLICATIONS

This application is a Submission Under 35 U.S.C. § 371 for U.S. National Stage Patent Application of International Application No.: PCT/IB2020/058796, filed Sep. 21, 2020 entitled "SHORT MESSAGE SERVICE (SMS) DELIVERY," which claims priority to U.S. Provisional Application No. 62/908,886, filed Oct. 1, 2019, entitled "SHORT MESSAGE SERVICE (SMS) DELIVERY," the entireties of both of which are incorporated herein by reference.

TECHNICAL FIELD

Wireless communication and in particular, methods and apparatuses for short message service (SMS) delivery.

BACKGROUND

In legacy, i.e., existing, systems, the procedure for mobile terminated-short message service (MT-SMS) delivery is triggered by the short message service center (SMSC) by requesting Routing Information for SMS to the home subscriber server/home location register (HSS/HLR) as defined in Third Generation Partnership Project (3GPP) Technical Specification (TS) 23.040, for example.

When a user equipment (UE) is not registered over any access network (2G/3G/4G), the HSS/HLR responds with an Absent Subscriber error and informs the SMSC that the SMSC will be notified when the UE becomes available again.

The HSS/HLR then sets the UE Reachability for SMS flags for the UE (e.g. MNRF, URRP-MME). When HSS/HLR receives an Update Location for a UE which has its UE Reachability flag set, the HSS/HLR then alerts the SMSC that the SMSC can re-attempt the MT-SMS delivery again.

The procedure for MT-SMS delivery over $3^{rd}$ Generation Partnership Project (3GPP) $5^{th}$ Generation (5G) (also known as New Radio (NR)) Non-access Stratum (NAS) is based on the same principles as for legacy systems. The SMSC requests Routing Information for SMS to the HSS/unified data management (UDM) as defined in 3GPP TS 23.502 for example.

However, the procedure for MT-SMS delivery re-attempt in 3GPP TS 23.502 is only covering the case of re-attempt when the MT-SMS delivery via the registered access and management function/short message service function (AMF/SMSF) failed. Arrangements to support MT-SMS delivery re-attempt when the UE is not registered in the $5^{th}$ Generation Core (5GC) network for SMS service in the first place (e.g., there is no SMSF registered in UDM when the SMSC requests routing information to the UDM) are not defined by 3GPP.

A UE may not be considered to be registered in 5GC for SMS service when the UE is not registered in the 5GC at all (i.e., not registered in AMF) or when the UE is registered in 5GC via an AMF but for some reason the AMF did not select an SMSF for the UE (e.g., the UE did not indicate support for SMS or the AMF area is restricted for the UE or due to error situation when contacting the SMSF).

In either of the above cases, the SMSC may be required to store the message for a while until the SMSC is alerted by the HLR/HSS/UDM that the UE is reachable for SMS service again.

A straightforward solution may be to apply the same principles as for the legacy system by having the HSS/UDM subscribe to UE reachability status notification. However, for the case of 5GC, this is not valid as reachability is managed and reported by the AMF, while the SMS Transport service is managed by the SMSF instead.

That may mean that if the HSS/UDM alerts the SMSC upon detecting an event for UE reachability in an AMF (e.g., when the AMF registers in UDM), but while an SMSF is not yet registered in the UDM for the UE, an endless loop of unsuccessful MT-SMS delivery re-attempts may result. FIG. 1 shows this case in the context of UDICOM as defined in TS 23.632 for example, where the HSS and the UDM are separated and interwork making use of Nudm services.

The flow diagram of FIG. 1 includes an access and management function (AMF) 12, a short message service function (SMSF) 14, unified data management (UDM) 16, home subscriber server/home location register (HSS/HLR) 18 and a short message service center (SMSC) 20. As shown in FIG. 1, the UE is not registered over any access (2G/3G/4G) (as in step 0). The HSS/HLR 18 receives a request for routing information from the SMSC 20 (as in step 1) and therefore the HSS/HLR 18 attempts to retrieve the registered SMSF 14 address (if any) from the UDM 16 (as in step 2); however, since the UE is not registered, the UDM 16 does not find any SMSF 14 registered in the UDM 16 and responds accordingly (as in step 3). In step 4, the HSS/HLR 18 responds with an Absent Subscriber error and informs the SMSC 20 that the HSS/HLR 18 will be notified when the UE becomes available again in step 5.

The HSS/HLR 18 then sets the UE Reachability for SMS flags for the UE (e.g. MNRF, URRP-MME), as in steps 6 and 7 of FIG. 1. Later, in step 8, the UE may register in the access network (2G/3G/4G) in the AMF 12 and the AMF 12 registers in the UDM 16, as well. In step 9, since e.g., the UE and AMF 12 are registered, the UDM 16 clears/resets the flag (but the SMSF is still not registered). When the HSS/HLR 18 receives an Update Location for a UE which has its UE Reachability flag set, as in step 10, the HSS/HLR 18 then alerts the SMSC 20 that the SMSC 20 can re-attempt the MT-SMS delivery again, as in step 11. Thus, in step 12, the SMSC 20 again sends a request for routing information to HSS/HLR 18 and the HSS/HLR 18 re-attempts to retrieve the registered SMSF 14 address (if any) from the UDM 16 in step 13; however, since the SMSF 14 is still not registered, the UDM 16 does not find any SMSF 14 registered in the UDM 16 and responds accordingly in step 14. The process is repeated over and over in an endless loop as shown in step 15.

SUMMARY

Some embodiments advantageously provide methods and apparatuses for SMS delivery.

According to one aspect of the present disclosure, there is provided a method implemented in a unified data management (UDM) node. The method includes receiving, from a home subscriber server (HSS) node, a request to subscribe to a notification, the notification being when a user equipment (UE) registers in a network for short message service (SMS). The method includes, as a result of the received request to subscribe, setting a SMS function (SMSF) registration notification flag to detect SMSF registration events associated with the UE.

According to another aspect of the present disclosure, a method implemented in a home subscriber server (HSS) node is provided. The method includes subscribing to a notification at a unified data management (UDM) node, the notification being when a user equipment (UE) registers in a network for short message service (SMS).

According to an aspect of the present disclosure, a method implemented in a unified data management, UDM, node is provided. The method includes setting a short message service, SMS, function, SMSF, registration notification flag to detect an SMSF registration event associated with a user equipment, UE.

In some embodiments of this aspect, the method further includes as a result of an SMSF registering at the UDM node for the UE and the SMSF registration notification flag being set for the UE, clearing the SMSF registration notification flag and sending a notification, the notification indicating that SMSF is registered at the UDM node for the UE. In some embodiments of this aspect, the method further includes receiving a request to subscribe to a notification about the SMSF registration event associated with the UE; and wherein the setting the SMSF registration notification flag is a result of the request to subscribe to the notification. In some embodiments of this aspect, the request to subscribe to the notification is received from a home subscriber server (HSS) node and the notification is sent to the HSS node. In some embodiments of this aspect, the request to subscribe is received by a Nudm_EE_Subscribe service operation. In some embodiments of this aspect, the method further includes as a result of receiving, from a short message service center, SMSC, node, a request for routing information for the UE, determining that the UE is at least one of not registered in a network associated with the UDM node and not registered for an SMS service in the network; and wherein the setting the SMSF registration notification flag is a result of the determination.

In some embodiments of this aspect, the method further includes as a result of the determination that the UE is at least one of not registered in the network associated with the UDM node and not registered for the SMS service in the network, indicating to the SMSC node that the UE is absent. In some embodiments of this aspect, sending the notification indicating that the SMSF is registered at the UDM node for the UE further comprises sending an alert to the SMSC node to retry an SMS delivery to the UE.

According to another aspect of the present disclosure, a method implemented in a home subscriber server, HSS, node is provided. The method includes sending a request to subscribe to a notification at a unified data management, UDM, node about a short message service, SMS, function, SMSF, registration event associated with a user equipment, UE.

In some embodiments of this aspect, the method further includes as a result of the subscription, receiving, from the UDM node, a notification, the notification indicating that an SMSF is registered at the UDM node for the UE; and as a result of receiving the notification, indicating to a short message service center, SMSC, node that the SMSF is registered at the UDM node for the UE. In some embodiments of this aspect, indicating to the SMSC node further comprises sending an alert to the SMSC node to retry an SMS delivery to the UE. In some embodiments of this aspect, sending the request to subscribe to the notification about the SMSF registration event is based at least in part on a determination that an SMSF is not registered at the UDM node for the UE. In some embodiments of this aspect, sending the request to subscribe to the notification about the SMSF registration event is based further on a determination that the UE is not registered at the HSS node for SMS.

In some embodiments of this aspect, the method further includes receiving, from a short message service center, SMSC, node, a request for routing information for the UE; and as a result of receiving the request from the SMSC node, as least one of: querying whether an SMSF registration notification flag is set at the UDM node; determining whether to retrieve an SMSF address from the UDM node for the UE based at least in part on whether the SMSF registration notification flat is set; determining that an SMSF address in not registered at the UDM node for the UE and that a target node address for SMS is not registered at the HSS node for the UE; and as a result of the determination that the SMSF address and the target node address is not registered for the UE in the UDM and HSS nodes respectively, indicating to the SMSC node that the UE is absent. In some embodiments of this aspect, the request to subscribe is sent by a Nudm_EE_Subscribe service operation.

According to yet another aspect of the present disclosure, a unified data management, UDM, node is provided. The UDM node includes processing circuitry. The processing circuitry is configured to cause the UDM node to set a short message service, SMS, function, SMSF, registration notification flag to detect an SMSF registration event associated with a user equipment, UE.

In some embodiments of this aspect, the processing circuitry is further configured to cause the UDM node to, as a result of an SMSF registering at the UDM node for the UE and the SMSF registration notification flag being set for the UE, clear the SMSF registration notification flag and send a notification, the notification indicating that SMSF is registered at the UDM node for the UE. In some embodiments of this aspect, the processing circuitry is further configured to cause the UDM node to receive a request to subscribe to a notification about the SMSF registration event associated with the UE; and the setting the SMSF registration notification flag is a result of the request to subscribe to the notification. In some embodiments of this aspect, the request to subscribe to the notification is received from a home subscriber server (HSS) node and the notification is sent to the HSS node. In some embodiments of this aspect, the request to subscribe is received by a Nudm_EE_Subscribe service operation.

In some embodiments of this aspect, the processing circuitry is further configured to cause the UDM node to as a result of receiving, from a short message service center, SMSC, node, a request for routing information for the UE, determine that the UE is at least one of not registered in a network associated with the UDM node and not registered for an SMS service in the network; and the setting the SMSF registration notification flag is a result of the determination. In some embodiments of this aspect, the processing circuitry is further configured to cause the UDM node to as a result of the determination that the UE is at least one of not registered in the network associated with the UDM node and not registered for the SMS service in the network, indicate to the SMSC node that the UE is absent. In some embodiments of this aspect, the processing circuitry is further configured to cause the UDM node to send the notification indicating that the SMSF is registered at the UDM node for the UE by being configured to send an alert to the SMSC node to retry an SMS delivery to the UE.

According to an aspect of the present disclosure, a home subscriber server, HSS, node is provided. The HSS node includes processing circuitry. The processing circuitry is configured to cause the HSS node to send a request to subscribe to a notification at a unified data management, UDM, node about a short message service, SMS, function, SMSF, registration event associated with a user equipment, UE.

In some embodiments of this aspect, the processing circuitry is further configured to cause the HSS node to as a result of the subscription, receive, from the UDM node, a notification, the notification indicating that an SMSF is registered at the UDM node for the UE; and as a result of receiving the notification, indicate to a short message service center, SMSC, node that the SMSF is registered at the UDM node for the UE. In some embodiments of this aspect, the processing circuitry is further configured to cause the HSS node to indicate to the SMSC node by being configured to cause the HSS node to send an alert to the SMSC node to retry an SMS delivery to the UE. In some embodiments of this aspect, the processing circuitry is further configured to cause the HSS node to send the request to subscribe to the notification about the SMSF registration event based at least in part on a determination that an SMSF is not registered at the UDM node for the UE.

In some embodiments of this aspect, the processing circuitry is further configured to cause the HSS node to send the request to subscribe to the notification about the SMSF registration event based further on a determination that the UE is not registered at the HSS node for SMS. In some embodiments of this aspect, the processing circuitry is further configured to cause the HSS node to receive, from a short message service center, SMSC, node, a request for routing information for the UE; and as a result of receiving the request from the SMSC node, as least one of: query whether an SMSF registration notification flag is set at the UDM node; determine whether to retrieve an SMSF address from the UDM node for the UE based at least in part on whether the SMSF registration notification flat is set; determine that an SMSF address in not registered at the UDM node for the UE and that a target node address for SMS is not registered at the HSS node for the UE; and as a result of the determination that the SMSF address and the target node address is not registered for the UE in the UDM and HSS nodes respectively, indicate to the SMSC node that the UE is absent. In some embodiments of this aspect, the request to subscribe is sent by a Nudm_EE_Subscribe service operation.

According to yet another aspect, an apparatus including computer program instructions stored in a non-transitory storage medium is provided. The computer program instructions are executable by at least one processor to perform any of the UDM node methods above.

According to yet another aspect, an apparatus comprising computer program instructions stored in a non-transitory storage medium is provided. The computer program instructions are executable by at least one processor to perform any of the HSS node methods above.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 is a flowchart of an exemplary process in a network node according to some embodiments of the present disclosure;

FIG. 5 is a flowchart of an exemplary process in a network node according to some embodiments of the present disclosure.

DETAILED DESCRIPTION

Figure 1:
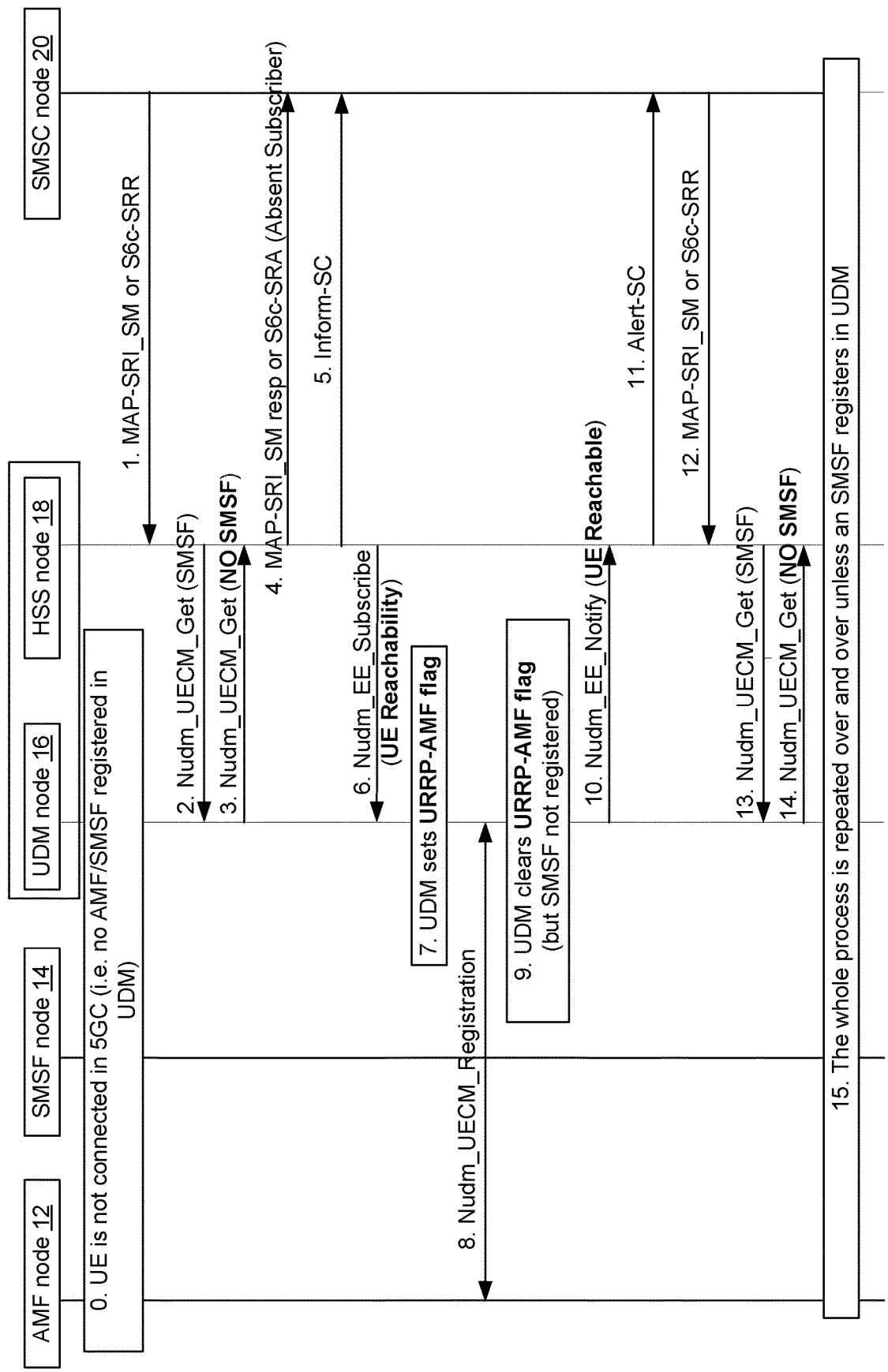
FIG. 1: illustrates an example of a mobile terminated SMS (MT-SMS) delivery reattempt issue.

Some embodiments of the present disclosure propose a definition and/or use of a NEW flag and/or event to detect UE reachability for SMS (e.g., SMSF registration in UDM) to cover the cases where e.g., there is an MT-SMS pending due to the UE not being registered in the 5GC for SMS service.

The NEW flag/event proposed by some embodiments of the present disclosure may provide support for the MT-SMS delivery reattempt when the UE is NOT registered for SMS service in the 5GC (e.g., when the SMSF is NOT registered in the UDM). As described above, the existing UE Reachability flags/events do not provide proper support for this case.

Before describing in detail exemplary embodiments, it is noted that the embodiments reside primarily in combinations of apparatus components and processing steps related to short message service (SMS) delivery. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some embodiments, the non-limiting terms wireless device (WD) or a user equipment (UE) are used interchangeably. The UE herein can be any type of wireless device capable of communicating with a network node or another UE over radio signals. In some embodiments, the UE may be an autonomous machine configured to communicate via IMS. The UE herein can by any type of communication device capable of communicating with another UE, an application server, a network node, a server, an IMS NF or other IMS network node, via a wired connection and/or a wireless connection. The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

In some embodiments, the term "node" is used herein and can be any kind of network node, such as, a subscriber database node, a core network node, such as a 5G and/or NR network node, an IMS node, a Network Function (NF) node, such as, for example, a P-CSCF node, an S-CSCF node, an I-CSCF node, an AMF node, an SMF node, an NRF node, a UDM node, an HSS node, an HLR node, a SMSC node, a SMSF node, etc.

A node may include physical components, such as processors, allocated processing elements, or other computing hardware, computer memory, communication interfaces, and other supporting computing hardware. The node may use dedicated physical components, or the node may be allocated use of the physical components of another device, such as a computing device or resources of a datacenter, in which case the node is said to be virtualized. A node may be associated with multiple physical components that may be located either in one location, or may be distributed across multiple locations.

It should be understood that the flags and events discussed in the present disclosure may have any name and should not be limited to the specific names used herein, which are exemplary and/descriptive, such as, "SMSF registration notification" flag or "UE ready for SMS" event, since the flag or event may, for example, be given another name in a specification, even though the use/function is as disclosed in the present disclosure.

Any two or more embodiments described in this disclosure may be combined in any way with each other.

Note also that some embodiments of the present disclosure may be supported by standard documents disclosed in Third Generation Partnership Project (3GPP) technical specifications. That is, some embodiments of the description can be supported by the above documents. In addition, all the terms disclosed in the present document may be described by the above standard documents.

Note that although terminology from one particular wireless system, such as, for example, $3^{rd}$ Generation Partnership Project (3GPP), Long Term Evolution (LTE), $5^{th}$ Generation (5G) (also known as New Radio (NR)), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a UE 22 or a UDM node 16 or an HSS node 18 or any network node may be distributed over a plurality of UEs 22 or a plurality of UDM nodes 16 or a plurality of HSS nodes 18 or a plurality of network nodes. In other words, it is contemplated that the functions of the UE 22, UDM node 16, HSS node 18 or network node described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
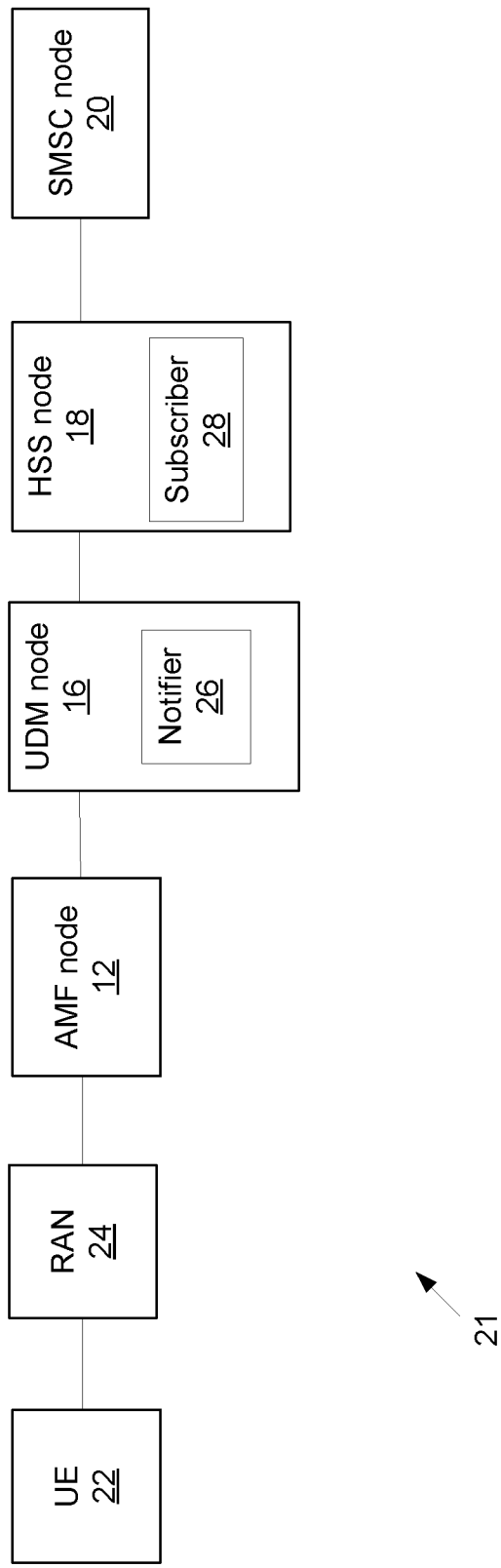
FIG. 2 illustrates another example system architecture according to some embodiments of the present disclosure.

Referring again to the drawing figures, in which like elements are referred to by like reference numerals, there is shown in FIG. 2 a schematic diagram of an example communication system 21, according to another embodiment, constructed in accordance with the principles of the present disclosure. The communication system 21 in FIG. 2 is a non-limiting example and other embodiments of the present disclosure may be implemented by one or more other systems and/or networks. Referring to FIG. 2, the system 21 includes a UE 22, in addition to various support elements for supporting short message service (SMS) delivery to the UE 22, such as, a radio access network (RAN) 24 (e.g., 5G also known as NR RAN), which may provide radio access to the UE 22. The system 21 includes an Access and Mobility Management Function (AMF) node 12, which may provide a function for access and mobility management for the UE 22. The system 21 includes the UDM node 16, which stores and manages subscriber information. The system 21 includes the HSS node 18, which may provide a database of user subscriber information. It should be noted that, for simplicity, a single node is shown for the various entities in the system 21 depicted in FIG. 2 (e.g., a single UE 22, a single RAN 24, a single AMF node 12, a single UDM node 16, a single HSS node 18 and a single SMSC node 20, etc.); however, it should be understood that the system 21 may include numerous entities/nodes of those shown in FIG. 2, as well as, additional entities/nodes not shown in FIG. 2. In addition, the system 21 may include many more connections than those shown in FIG. 2.

The UDM node 16 includes a notifier 26, which may be configured to set a short message service, SMS, function, SMSF, registration notification flag to detect an SMSF registration event associated with a user equipment, UE 22.

The HSS node 18 includes a subscriber 28, which may be configured to send a request to subscribe to a notification at a unified data management, UDM, node 16 about a short message service, SMS, function, SMSF, registration event associated with a user equipment, UE 22.

Example implementations, in accordance with an embodiment, of the UE 22, UDM node 16, HSS node 18 and a network node 29 (e.g., SMSC node, AMF node, etc.) discussed in the preceding paragraphs will now be described with reference to FIG. 3.

The network node 29 (e.g., AMF node, SMSC node, etc.) includes a communication interface 30, processing circuitry 32, and memory 34. The communication interface 30 may be configured to communicate with the UE 22 and/or other elements in the system 21 to facilitate delivery of an SMS message to the UE 22 according to one or more of the techniques in the present disclosure. In some embodiments, the communication interface 30 may be formed as or may include, for example, one or more radio frequency (RF) transmitters, one or more RF receivers, and/or one or more RF transceivers, and/or may be considered a radio interface. In some embodiments, the communication interface 30 may also include a wired interface.

The processing circuitry 32 may include one or more processors 36 and memory, such as, the memory 34. In particular, in addition to a traditional processor and memory, the processing circuitry 32 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 36 may be configured to access (e.g., write to and/or read from) the memory 34, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 29 may further include software stored internally in, for example, memory 34, or stored in external memory (e.g., database) accessible by the network node 29 via an external connection. The software may be executable by the processing circuitry 32. The processing circuitry 32 may be configured to control any of the methods and/or processes described herein and/or to cause such methods, and/or processes to be performed, e.g., by the network node 29. The memory 34 is configured to store data, programmatic software code and/or other information described herein. In some embodiments, the software may include instructions stored in memory 34 that, when executed by the processor 36, causes the processing circuitry 32 and/or configures the network node 29 to perform the processes described herein with respect to the network node 29 (e.g., AMF node, SMSC node, etc.).

The UE 22 includes a communication interface 40, processing circuitry 42, and memory 44. The communication interface 40 may be configured to communicate with the RAN 24 and/or AMF node 12 and/or other elements in the system 21 to be delivered an SMS message according to the techniques in the present disclosure. In some embodiments, the communication interface 40 may be formed as or may include, for example, one or more radio frequency (RF) transmitters, one or more RF receivers, and/or one or more RF transceivers, and/or may be considered a radio interface. In some embodiments, the communication interface 40 may also include a wired interface.

The processing circuitry 42 may include one or more processors 46 and memory, such as, the memory 44. In particular, in addition to a traditional processor and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 46 may be configured to access (e.g., write to and/or read from) the memory 44, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE 22 may further include software stored internally in, for example, memory 44, or stored in external memory (e.g., database) accessible by the UE 22 via an external connection. The software may be executable by the processing circuitry 42. The processing circuitry 42 may be configured to control any of the methods and/or processes described herein and/or to cause such methods, and/or processes to be performed, e.g., by the UE 22. The memory 44 is configured to store data, programmatic software code and/or other information described herein. In some embodiments, the software may include instructions stored in memory 44 that, when executed by the processor 46 causes the processing circuitry 42 and/or configures the UE 22 to perform the processes described herein with respect to the UE 22.

The UDM node 16 includes a communication interface 50, processing circuitry 52, and memory 54. The communication interface 50 may be configured to communicate with the AMF node 12 and/or HSS 18 and/or other elements in the system 21 to facilitate delivery of an SMS message to the UE 22 according to one or more of the techniques in the present disclosure. In some embodiments, the communication interface 50 may be formed as or may include, for example, one or more radio frequency (RF) transmitters, one or more RF receivers, and/or one or more RF transceivers, and/or may be considered a radio interface. In some embodiments, the communication interface 50 may also include a wired interface.

The processing circuitry 52 may include one or more processors 56 and memory, such as, the memory 54. In particular, in addition to a traditional processor and memory, the processing circuitry 52 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 56 may be configured to access (e.g., write to and/or read from) the memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UDM node 16 may further include software stored internally in, for example, memory 54, or stored in external memory (e.g., database) accessible by the UDM node 16 via an external connection. The software may be executable by the processing circuitry 52. The processing circuitry 52 may be configured to control any of the methods and/or processes described herein and/or to cause such methods, and/or processes to be performed, e.g., by the UDM node 16. The memory 54 is configured to store data, programmatic software code and/or other information described herein. In some embodiments, the software may include instructions stored in memory 54 that, when executed by the processor 56 and/or notifier 26, causes the processing circuitry 52 and/or configures the UDM node 16 to perform the processes described herein with respect to the UDM node 16 (e.g., processes described with reference to FIG. 4 and/or any of the other flowcharts).

The HSS node 18 includes a communication interface 60, processing circuitry 62, and memory 64. The communication interface 60 may be configured to communicate with the UDM node 16 and/or the SMSC node 20 and/or other elements in the system 21 to facilitate delivery of an SMS message to the UE 22 according to one or more of the techniques in the present disclosure. In some embodiments, the communication interface 60 may be formed as or may include, for example, one or more radio frequency (RF) transmitters, one or more RF receivers, and/or one or more RF transceivers, and/or may be considered a radio interface. In some embodiments, the communication interface 60 may also include a wired interface.

The processing circuitry 62 may include one or more processors 66 and memory, such as, the memory 64. In particular, in addition to a traditional processor and memory, the processing circuitry 62 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 66 may be configured to access (e.g., write to and/or read from) the memory 64, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the HSS node 18 may further include software stored internally in, for example, memory 64, or stored in external memory (e.g., database) accessible by the HSS node 18 via an external connection. The software may be executable by the processing circuitry 62. The processing circuitry 62 may be configured to control any of the methods and/or processes described herein and/or to cause such methods, and/or processes to be performed, e.g., by the HSS node 18. The memory 64 is configured to store data, programmatic software code and/or other information described herein. In some embodiments, the software may include instructions stored in memory 64 that, when executed by the processor 66 and/or subscriber 28, causes the processing circuitry 62 and/or configures the HSS node 18 to perform the processes described herein with respect to the HSS node 18 (e.g., processes described with reference to FIG. 5 and/or any of the other flowcharts).

Figure 3:
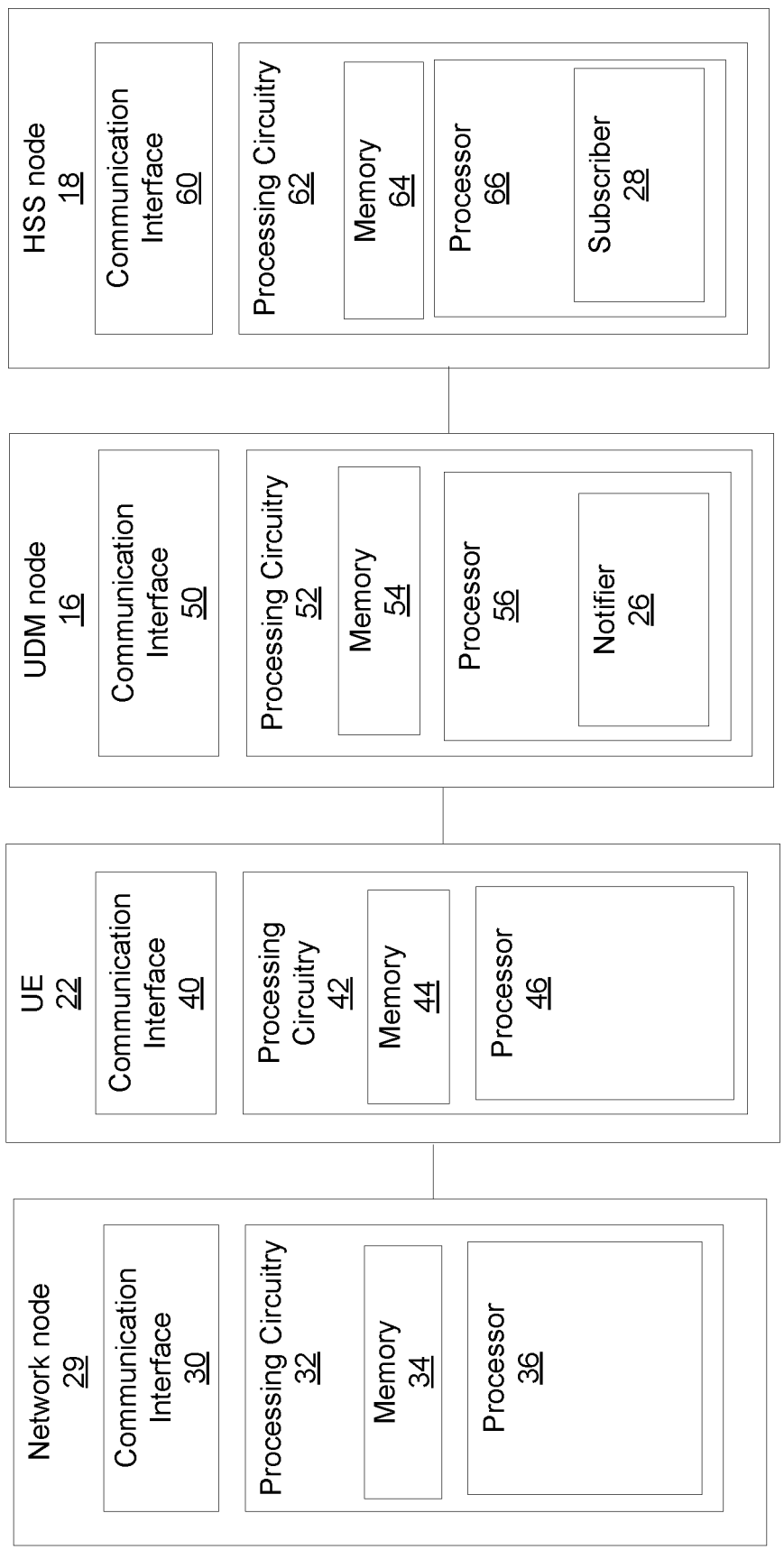
FIG. 3 illustrates yet another example system architecture and example hardware arrangements for devices in the system, according to some embodiments of the present disclosure.

In FIG. 3, the connection between the devices UE 22, UDM node 16, HSS node 18 and network node 29 is shown without explicit reference to any intermediary devices or connections. However, it should be understood that intermediary devices and/or connections may exist between these devices, although not explicitly shown.

Although FIG. 3 shows notifier 26 and subscriber 28, as being within a respective processor, it is contemplated that these elements may be implemented such that a portion of the elements is stored in a corresponding memory within the processing circuitry. In other words, the elements may be implemented in hardware or in a combination of hardware and software within the processing circuitry.

FIG. 4 is a flowchart of an exemplary process in a UDM node 16 for facilitating delivery of an SMS message to the UE 22 according to one or more of the techniques in the present disclosure. One or more Blocks and/or functions and/or methods performed by the UDM node 16 may be performed by one or more elements of UDM node 16 such as by notifier 26 in processing circuitry 52, memory 54, processor 56, communication interface 50, etc. according to the example process/method. The example process includes setting (Block S100), such as via notifier 26, processing circuitry 52, memory 54, processor 56 and/or communication interface 50, a short message service, SMS, function, SMSF, registration notification flag to detect an SMSF registration event associated with a user equipment, UE 22.

In some embodiments, the method further includes as a result of an SMSF registering at the UDM node 16 for the UE 22 and the SMSF registration notification flag being set for the UE 22, clearing the SMSF registration notification flag and sending a notification, the notification indicating that SMSF is registered at the UDM node 16 for the UE 22. In some embodiments, the method further includes receiving notifier 26 in processing circuitry 52, memory 54, processor 56, communication interface 50, a request to subscribe to a notification about the SMSF registration event associated with the UE 22; and the setting the SMSF registration notification flag is a result of the request to subscribe to the notification.

In some embodiments, the request to subscribe to the notification is received from a home subscriber server (HSS) node 18 and the notification is sent to the HSS node 18. In some embodiments, the request to subscribe is received by a Nudm_EE_Subscribe service operation. In some embodiments, the method further includes, as a result of receiving, from a short message service center, SMSC, node 20, a request for routing information for the UE 22, determining that the UE 22 is at least one of not registered in a network associated with the UDM node 16 and not registered for an SMS service in the network; and the setting the SMSF registration notification flag is a result of the determination.

In some embodiments, the method further includes as a result of the determination that the UE 22 is at least one of not registered in the network associated with the UDM node 16 and not registered for the SMS service in the network, indicating notifier 26 in processing circuitry 52, memory 54, processor 56, communication interface 50, to the SMSC node 20 that the UE 22 is absent. In some embodiments, sending notifier 26 in processing circuitry 52, memory 54, processor 56, communication interface 50, the notification indicating that the SMSF is registered at the UDM node 16 for the UE 22 further comprises sending an alert to the SMSC node 20 to retry an SMS delivery to the UE 22.

In some embodiments, the method includes receiving, such as via notifier 26, processing circuitry 52, memory 54, processor 56 and/or communication interface 50, from a home subscriber server (HSS) node 18, a request to subscribe to a notification, the notification being when a user equipment (UE) 22 registers in a network for short message service (SMS). The process includes as a result of the received request to subscribe, setting, such as via notifier 26, processing circuitry 52, memory 54, processor 56 and/or communication interface 50, a SMS function (SMSF) registration notification flag to detect SMSF registration events associated with the UE 22.

In some embodiments, the method further includes, as a result of an SMSF registering at the UDM node for the UE, detecting/determining, such as via notifier 26, processing circuitry 52, memory 54, processor 56 and/or communication interface 50, that the SMSF registration notification flag is set for the UE 22 for which the SMSF is registered for. In some embodiments, the method includes, as a result of the detecting/determining, resetting/clearing, such as via notifier 26, processing circuitry 52, memory 54, processor 56 and/or communication interface 50, the SMSF registration notification flag. In some embodiments, the method includes, as a result of the detecting/determining, notifying, such as via notifier 26, processing circuitry 52, memory 54, processor 56 and/or communication interface 50, the HSS node 18 that the UE 22 is registered in the network for SMS. In some embodiments, the network for the UE to be registered in for SMS is a 5th Generation core (5GC) network. In some embodiments, the notification is a UE 22 ready for SMS notification. In some embodiments, the request to subscribe is received by a Nudm_EE_Subscribe service operation.

FIG. 5 is a flowchart of an exemplary process in an HSS node 18 for facilitating delivery of an SMS message to the UE 22 according to one or more of the techniques in the present disclosure. One or more Blocks and/or functions and/or methods performed by the HSS node 18 may be performed by one or more elements of HSS node 18 such as subscriber 28 in processing circuitry 62, memory 64, processor 66, communication interface 60, etc. according to the example process/method. The example process includes sending (Block S102), such as via subscriber 28, processing circuitry 62, memory 64, processor 66 and/or communication interface 60, a request to subscribe to a notification at a unified data management, UDM, node 18 about a short message service, SMS, function, SMSF, registration event associated with a user equipment, UE 22.

In some embodiments, the method further includes as a result of the subscription, receiving, such as via subscriber 28, processing circuitry 62, memory 64, processor 66 and/or communication interface 60, from the UDM node 16, a notification, the notification indicating that an SMSF is registered at the UDM node 16 for the UE 22; and as a result of receiving the notification, indicating, such as via subscriber 28, processing circuitry 62, memory 64, processor 66 and/or communication interface 60, to a short message service center, SMSC, node 20 that the SMSF is registered at the UDM node 16 for the UE 22.

In some embodiments, indicating, such as via subscriber 28, processing circuitry 62, memory 64, processor 66 and/or communication interface 60, to the SMSC node 20 further comprises sending an alert to the SMSC node 20 to retry an SMS delivery to the UE 22. In some embodiments, sending, such as via subscriber 28, processing circuitry 62, memory 64, processor 66 and/or communication interface 60, the request to subscribe to the notification about the SMSF registration event is based at least in part on a determination that an SMSF is not registered at the UDM node 16 for the UE 22. In some embodiments, sending, such as via subscriber 28, processing circuitry 62, memory 64, processor 66 and/or communication interface 60, the request to subscribe to the notification about the SMSF registration event is based further on a determination that the UE 22 is not registered at the HSS node 18 for SMS.

In some embodiments, the method further includes receiving, such as via subscriber 28, processing circuitry 62, memory 64, processor 66 and/or communication interface 60, from a short message service center, SMSC, node 20, a request for routing information for the UE 22; and as a result of receiving the request from the SMSC node 20, as least one of: querying, such as via subscriber 28, processing circuitry 62, memory 64, processor 66 and/or communication interface 60, whether an SMSF registration notification flag is set at the UDM node 16; determining, such as via subscriber 28, processing circuitry 62, memory 64, processor 66 and/or communication interface 60, whether to retrieve an SMSF address from the UDM node 16 for the UE 22 based at least in part on whether the SMSF registration notification flat is set; determining, such as via subscriber 28, processing circuitry 62, memory 64, processor 66 and/or communication interface 60, that an SMSF address in not registered at the UDM node 16 for the UE 22 and that a target node address for SMS is not registered at the HSS node 18 for the UE 22; and as a result of the determination that the SMSF address and the target node address is not registered for the UE 22 in the UDM 16 and HSS nodes 18 respectively, indicating to the SMSC node that the UE 22 is absent.

In some embodiments, the request to subscribe is sent by a Nudm_EE_Subscribe service operation.

In some embodiments, the method includes subscribing, such as via subscriber 28, processing circuitry 62, memory 64, processor 66 and/or communication interface 60, to a notification at a unified data management (UDM) node 16, the notification being when a user equipment (UE) 22 registers in a network for short message service (SMS).

In some embodiments, the method further includes, as a result of the subscription, receiving, such as via subscriber 28, processing circuitry 62, memory 64, processor 66 and/or communication interface 60, from the UDM node 16, a notification that the UE 22 is registered in the network for SMS. In some embodiments, the method further includes, as a result of receiving the notification, sending, such as via subscriber 28, processing circuitry 62, memory 64, processor 66 and/or communication interface 60, an alert to a short message service center (SMSC) node 20 that the UE 22 is ready for an SMS. In some embodiments, the network for the UE to be registered in for SMS is a 5th Generation core (5GC) network. In some embodiments, the notification is a UE ready for SMS notification. In some embodiments, the subscribing further includes subscribing, such as via subscriber 28, processing circuitry 62, memory 64, processor 66 and/or communication interface 60, using a Nudm_EE_Subscribe service operation. In some embodiments, the subscribing to the notification at the UDM node is responsive to receiving, such as via subscriber 28, processing circuitry 62, memory 64, processor 66 and/or communication interface 60, a response message from the UDM node 16 that an SMSF is not registered at the UDM node 16 for the UE 22.

Having generally described arrangements for short message service (SMS) delivery, a more detailed description of some of the embodiments are provided as follows with reference to FIG. 6, and which may be implemented by UE 22, UDM node 16, HSS node 18 and/or network node 29 (e.g., AMF node 12, SMSC node 20, etc.).

Some embodiments of the present disclosure provide a definition and/or use of a NEW flag/event to detect UE 22 reachability for SMS (e.g., SMSF registration in UDM node 16) to cover the cases where there is an MT-SMS pending due to the UE 22 not being registered in the 5GC for SMS service.

Figure 6:
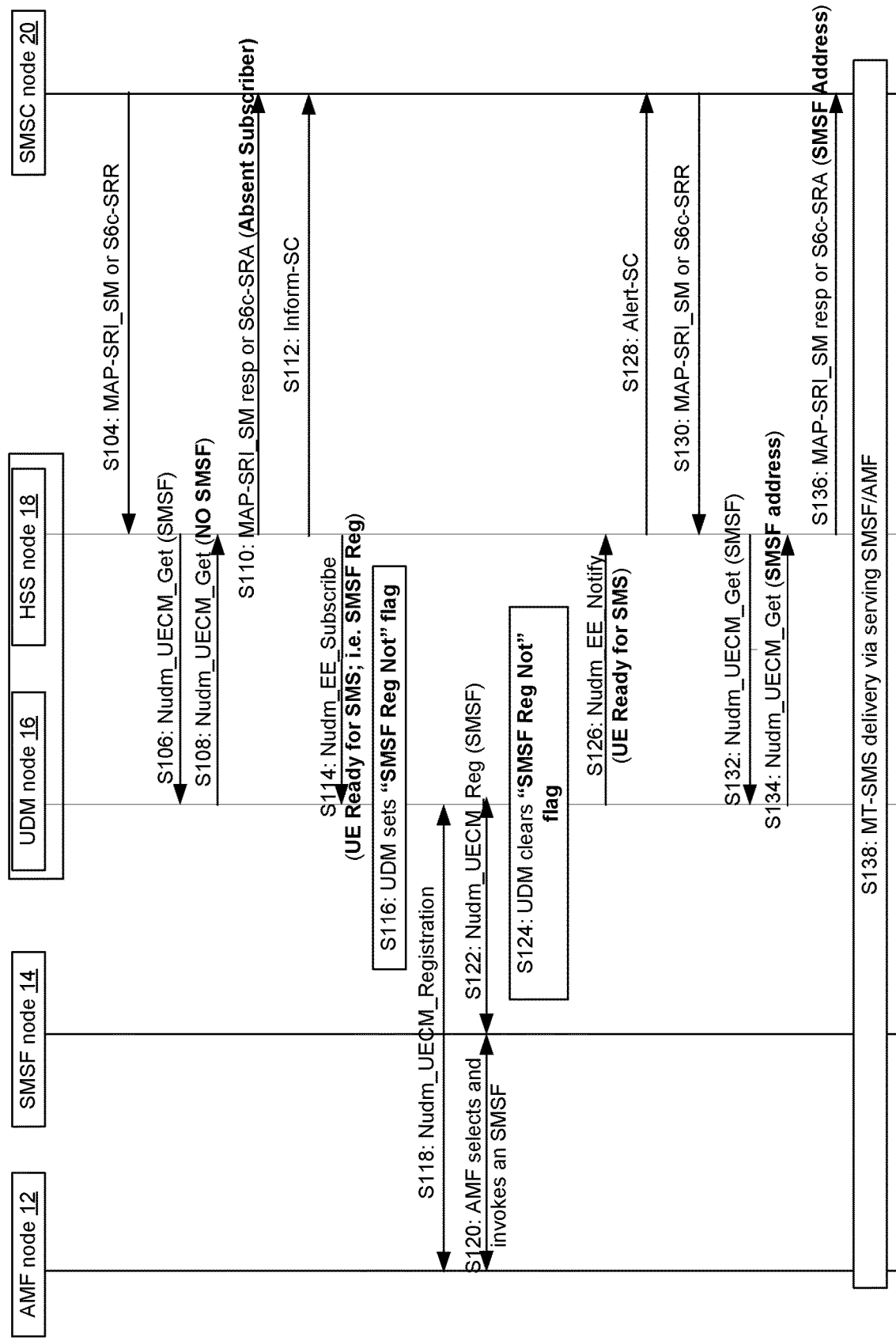
FIG. 6 illustrates an example of a MT-SMS delivery reattempt using a UE Ready for SMS event and SMS Registration Notification Flag according to one embodiment of the present disclosure.

One example of the use of the new flag/event is illustrated in FIG. 6, as described in the steps below (note that as in FIG. 1, FIG. 6 shows that the UE 22 (not shown here) is not connected to 5GC, i.e., no AMF/SMSF 12/14 registered in UDM node 16):

S104: The HSS node 18 (e.g., via communication interface 60 and/or processing circuitry 62) receives a request for routing information from the SMSC node 20 via a Mobile Application Part (MAP) or S6c protocol/messages.

S106: The HSS node 18 (e.g., via communication interface 60 and/or processing circuitry 62) retrieves the registered SMSF 14 addresses (if any) from the UDM node 16.

S108: The UDM node 16 (e.g., via communication interface 50 and/or processing circuitry 52) does not find any SMSF node 14 registered in UDM node 16 and responds to the HSS node 18 accordingly.

S110: The HSS node 18 (e.g., via communication interface 60 and/or processing circuitry 62) provides a negative response (Absent Subscriber SM) that is sent to the SMSC node 20.

S112: The HSS node 18 (e.g., via communication interface 60 and/or processing circuitry 62) informs the SMSC node 20 that the SMSC node 20 address has been included in the Message Waiting Data (MWD) and that the SMSC node 20 will be alerted when the UE 22 becomes reachable and ready for SMS again.

S114: The HSS node (e.g., via communication interface 60 and/or processing circuitry 62) 18 subscribes in the UDM node 16 to be notified when the UE 22 registers in the 5GC for SMS service (e.g., the UE 22 is ready for SMS in 5GC when an SMSF node 14 is registered in UDM node 16 for the UE 22) by using the Nudm_EE_Subscribe service operation (subscriber unique permanent identifier/SUPI, "UE Ready for SMS" event).

NOTE: The Nudm_EE_Subscribe service operation is already defined by 3GPP. The present disclosure proposes a new event for notification of "UE Ready for SMS".

S116: The UDM node 16 (e.g., via communication interface 50 and/or processing circuitry 52) sets a new SMSF Registration Notification flag to detect SMSF Registration events. The HSS node 18 may set the SMSF Registration Notification flag locally (not depicted).

S118: The UE 22 (e.g., via communication interface 40 and/or processing circuitry 42) then registers in the 5GC via an AMF node 12. The AMF node 12 registers in the UDM node 16 as well.

S120: If the UE 22 indicates support for SMS service, the AMF node 12 checks if the UE 22 is subscribed to an SMS service and if so the AMF node 12 selects and invokes an SMSF node 14. The SMSF node 14 then registers in the UDM node 16.

S122: After the SMSF 14 registration, the UDM node 16 detects that the UE 22 for which the SMSF node 14 is registered for has the SMSF Registration Notification flag set.

S124: The UDM node 16 (e.g., via communication interface 50 and/or processing circuitry 52) resets/clears the flag.

S126: The UDM node 16 (e.g., via communication interface 50 and/or processing circuitry 52) then notifies the HSS node 18 that the UE 22 is registered in 5GC for SMS service e.g., the UE is ready for SMS.

S128: The HSS node 18 (e.g., via communication interface 60 and/or processing circuitry 62) then alerts the SMSC node 20.

S130: The SMSC node 20 initiates the MT-SMS delivery reattempt by requesting the HSS node 18 routing information for SMS again.

S132: The HSS node 18 (e.g., via communication interface 60 and/or processing circuitry 62) then requests the SMSF node 14 address from the UDM node 16.

S134: In this case (due to the new flag/event), the UDM node 16 (e.g., via communication interface 50 and/or processing circuitry 52) responds with a valid SMSF node 14 address.

S136: The HSS node 18 (e.g., via communication interface 60 and/or processing circuitry 62) sends the SMSF node 14 address to the SMSC node 20.

S138: The SMSC node 20 can finally send the MT-SMS to the UE 22 via the registered SMSF node 14 and the registered AMF node 12.

It should be understood that although the example embodiments discussed herein may use one or another type of message or one or another network node arrangement or context, the techniques disclosed herein may be used with other types of messages or other types of network architecture arrangements or other contexts, to support SMS delivery according to the techniques provided in this disclosure.

Some embodiments of the present disclosure provide for a definition and/or use of a NEW flag/event to detect UE reachability for SMS (e.g., SMSF registration in UDM) to cover the cases where, for example, there is an MT-SMS pending due to the UE not being registered in the 5GC for SMS service.

Some embodiments may include one or more of the following:

Embodiment A1. A method implemented in a unified data management (UDM) node, the method comprising:
  receiving, from a home subscriber server (HSS) node, a request to subscribe to a notification, the notification being when a user equipment (UE) registers in a network for short message service (SMS); and
  as a result of the received request to subscribe, setting a SMS function (SMSF) registration notification flag to detect SMSF registration events associated with the UE.

Embodiment A2. The method of Embodiment A1, further comprising:
  as a result of an SMSF registering at the UDM node for the UE, one or more of:
    detecting that the SMSF registration notification flag is set for the UE for which the SMSF is registered for;
    as a result of the detecting, resetting the SMSF registration notification flag; and/or
    as a result of the detecting, notifying the HSS node that the UE is registered in the network for SMS.

Embodiment A3. The method of any one of Embodiments A1 and A2, wherein one or more of:
  the network for the UE to be registered in for SMS is a 5th Generation core (5GC) network;
  the notification is a UE ready for SMS notification; and/or
  the request to subscribe is received by a Nudm_EE_Subscribe service operation.

Embodiment B1. A method implemented in a home subscriber server (HSS) node, the method comprising:
  subscribing to a notification at a unified data management (UDM) node, the notification being when a user equipment (UE) registers in a network for short message service (SMS).

Embodiment B2. The method of Embodiment B1, further comprising one or more of:
  as a result of the subscription, receiving, from the UDM node, a notification that the UE is registered in the network for SMS; and/or
  as a result of receiving the notification, sending an alert to a short message service center (SMSC) node that the UE is ready for an SMS.

Embodiment B3. The method of any one of Embodiments B1 and B2, wherein one or more of:
  the network for the UE to be registered in for SMS is a 5th Generation core (5GC) network;
  the notification is a UE ready for SMS notification;
  the subscribing further includes subscribing using a Nudm_EE_Subscribe service operation; and/or
  the subscribing to the notification at the UDM node is responsive to receiving a response message from the UDM node that an SMSF is not registered at the UDM node for the UE.

Embodiment C1. A unified data management (UDM) node comprising processing circuitry, the processing circuitry configured to:

receive, from a home subscriber server (HSS) node, a request to subscribe to a notification, the notification being when a user equipment (UE) registers in a network for short message service (SMS); and as a result of the received request to subscribe, set a SMS function (SMSF) registration notification flag to detect SMSF registration events associated with the UE.

Embodiment C2. The UDM node of Embodiment C1, wherein the processing circuitry is further configured to:

as a result of an SMSF registering at the UDM node for the UE, one or more of:

detect that the SMSF registration notification flag is set for the UE for which the SMSF is registered for;

as a result of the detecting, reset the SMSF registration notification flag; and/or as a result of the detecting, notify the HSS node that the UE is registered in the network for SMS.

Embodiment C3. The UDM node of any one of Embodiments C1 and C2, wherein one or more of:

the network for the UE to be registered in for SMS is a 5th Generation core (5GC) network;

the notification is a UE ready for SMS notification; and/or the request to subscribe is received by a Nudm_EE_Subscribe service operation.

Embodiment D1. A home subscriber server (HSS) node comprising processing circuitry, the processing circuitry configured to:

subscribe to a notification at a unified data management (UDM) node, the notification being when a user equipment (UE) registers in a network for short message service (SMS).

Embodiment D2. The HSS node of Embodiment D1, wherein the processing circuitry is further configured to one or more of:

as a result of the subscription, receive, from the UDM node, a notification that the UE is registered in the network for SMS; and/or as a result of receiving the notification, send an alert to a short message service center (SMSC) node that the UE is ready for an SMS.

Embodiment D3. The HSS node of any one of Embodiments D1 and D2, wherein one or more of:

the network for the UE to be registered in for SMS is a 5th Generation core (5GC) network;

the notification is a UE ready for SMS notification;

the processing circuitry is further configured to subscribe to the notification by being configured to subscribe using a Nudm_EE_Subscribe service operation; and/or the processing circuitry is further configured to subscribe to the notification at the UDM node responsive to receiving a response message from the UDM node that an SMSF is not registered at the UDM node for the UE.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a unified data management, UDM, node, the method comprising:
    as a result of receiving, from a short message service center, SMSC, node, a request for routing information for a user equipment, UE, determining that the UE is at least one of not registered in a network associated with the UDM node and not registered for a short message service, SMS, in the network;
    as a result of the determination that the UE is at least one of not registered in the network associated with the UDM node and not registered for the SMS in the network, setting an indication supporting mobile terminated short message service, MT-SMS, delivery reattempt and indicating to the SMSC node that the UE is absent; and
    as a result of an SMS function, SMSF, registering at the UDM node for the UE and the SMSF registration notification flag being set for the UE, sending an alert to the SMSC node to retry an SMS delivery to the UE.

2. The method of claim 1, further comprising:
    as the result of the SMSF registering at the UDM node for the UE and the indication supporting MT-SMS delivery reattempt for the UE, clearing the indication and sending a notification, the notification indicating that the SMSF is registered at the UDM node for the UE.

3. The method of claim 1, further comprising:
    receiving a request to subscribe to a notification about the SMSF registration event associated with the UE; and
    wherein the setting the SMSF registration notification flag is a result of the request to subscribe to the notification.

4. The method of claim 3, wherein the request to subscribe to the notification is received from a home subscriber server, HSS, node and the notification is sent to the HSS node.

5. The method of claim 3, wherein the request to subscribe is received by a Nudm_EE_Subscribe service operation.

6. The method of claim 1, wherein the indication supporting MT-SMS delivery reattempt comprises setting an SMS registration notification flag to detect an SMSF registration event.

7. A method implemented in a home subscriber server, HSS, node, the method comprising:
    when a user equipment, UE, is at least one of not registered in a network associated with a unified data management, UDM node and not registered for a short message service, SMS, in the network, sending a request to subscribe to a notification at the UDM node about an SMS function, SMSF, registration event associated with the UE.

8. The method of claim 7, further comprising:
    as a result of the subscription, receiving, from the UDM node, a notification, the notification indicating that an SMSF is registered at the UDM node for the UE; and
    as a result of receiving the notification, indicating to a short message service center, SMSC, node that the SMSF is registered at the UDM node for the UE.

9. The method of claim 8, wherein indicating to the SMSC node further comprises sending an alert to the SMSC node to retry an SMS delivery to the UE.

10. The method of claim 7, wherein sending the request to subscribe to the notification about the SMSF registration event is based at least in part on a determination that an SMSF is not registered at the UDM node for the UE.

11. The method of claim 10, wherein sending the request to subscribe to the notification about the SMSF registration event is based further on a determination that the UE is not registered at the HSS node for SMS.

12. The method of claim 7, further comprising:
    receiving, from a short message service center, SMSC, node, a request for routing information for the UE; and
    as a result of receiving the request from the SMSC node, as least one of:
        querying whether an SMSF registration notification flag is set at the UDM node;
        determining whether to retrieve an SMSF address from the UDM node for the UE based at least in part on whether the SMSF registration notification flag is set;
        determining that the SMSF address in not registered at the UDM node for the UE and that a target node address for SMS is not registered at the HSS node for the UE; and
        as a result of the determination that the SMSF address and the target node address is not registered for the UE in the UDM and HSS nodes respectively, indicating to the SMSC node that the UE is absent.

13. The method of claim 7, wherein the request to subscribe is sent by a Nudm_EE_Subscribe service operation.

14. A unified data management, UDM, node, the UDM node comprising processing circuitry, the processing circuitry configured to cause the UDM node to:
    as a result of receiving, from a short message service center, SMSC, node, a request for routing information for a user equipment, UE, determine that the UE is at least one of not registered in a network associated with the UDM node and not registered for a short message service, SMS, in the network;
    as a result of the determination that the UE is at least one of not registered in the network associated with the UDM node and not registered for the SMS in the network, set an indication supporting mobile terminated short message service, MT-SMS, delivery reattempt and indicate to the SMSC node that the UE is absent; and
    as a result of an SMS function, SMSF, registering at the UDM node for the UE and the SMSF registration notification flag being set for the UE, send an alert to the SMSC node to retry an SMS delivery to the UE.

15. The UDM node of claim 14, wherein the processing circuitry is further configured to cause the UDM node to:
    as the result of the SMSF registering at the UDM node for the UE and the indication supporting MT-SMS delivery reattempt for the UE, clearing the indication and sending a notification, the notification indicating that the SMSF is registered at the UDM node for the UE.

16. The UDM node of claim 14, wherein the processing circuitry is further configured to cause the UDM node to:
    receive a request to subscribe to a notification about an SMSF registration event associated with the UE; and
    wherein the setting the SMSF registration notification flag is a result of the request to subscribe to the notification.

17. The UDM node of claim 16, wherein the request to subscribe to the notification is received from a home subscriber server, HSS, node and the notification is sent to the HSS node.

18. The UDM node of claim 16, wherein the request to subscribe is received by a Nudm_EE_Subscribe service operation.

19. The USM node of claim 14, wherein the indication supporting MT-SMS delivery reattempt comprises setting an SMS registration notification flag to detect an SMSF registration event.

20. A home subscriber server, HSS, node, the HSS node comprising processing circuitry, the processing circuitry configured to cause the HSS node to:
  when a user equipment, UE, is at least one of not registered in a network associated with a unified data management, UDM, node and not registered for a short message service, SMS, in the network, send a request to subscribe to a notification at the UDM node about an SMS function, SMSF, registration event associated with a user equipment, UE.

21. The HSS node of claim 20, wherein the processing circuitry is further configured to cause the HSS node to:
  as a result of the subscription, receive, from the UDM node, a notification, the notification indicating that an SMSF is registered at the UDM node for the UE; and
  as a result of receiving the notification, indicate to a short message service center, SMSC, node that the SMSF is registered at the UDM node for the UE.

22. The HSS node of claim 21, wherein the processing circuitry is further configured to cause the HSS node to indicate to the SMSC node by being configured to cause the HSS node to send an alert to the SMSC node to retry an SMS delivery to the UE.

23. The HSS node of claim 20, wherein the processing circuitry is further configured to cause the HSS node to send the request to subscribe to the notification about the SMSF registration event based at least in part on a determination that an SMSF is not registered at the UDM node for the UE.

24. The HSS node of claim 23, the processing circuitry is further configured to cause the HSS node to send the request to subscribe to the notification about the SMSF registration event based further on a determination that the UE is not registered at the HSS node for SMS.

25. The HSS node of claim 20, wherein the processing circuitry is further configured to cause the HSS node to:
  receive, from a short message service center, SMSC, node, a request for routing information for the UE; and
  as a result of receiving the request from the SMSC node, as least one of:
    query whether an SMSF registration notification flag is set at the UDM node;
    determine whether to retrieve an SMSF address from the UDM node for the UE based at least in part on whether the SMSF registration notification flag is set;
    determine that the SMSF address in not registered at the UDM node for the UE and that a target node address for SMS is not registered at the HSS node for the UE; and
    as a result of the determination that the SMSF address and the target node address is not registered for the UE in the UDM and HSS nodes respectively, indicate to the SMSC node that the UE is absent.

26. The HSS node of claim 20, wherein the request to subscribe is sent by a Nudm_EE_Subscribe service operation.

* * * * *